(12) United States Patent
Uehara

(10) Patent No.: US 6,502,031 B2
(45) Date of Patent: Dec. 31, 2002

(54) VEHICLE POSITION RECOGNIZING SYSTEM

(75) Inventor: Naohisa Uehara, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/963,363

(22) Filed: Sep. 27, 2001

(65) Prior Publication Data

US 2002/0143465 A1 Oct. 3, 2002

(30) Foreign Application Priority Data

Mar. 27, 2001 (JP) .................................. 2001-090257

(51) Int. Cl.[7] .............................................. G01C 21/00
(52) U.S. Cl. ......................... 701/207; 701/28; 701/23; 180/167; 180/168
(58) Field of Search ........................... 701/207, 28, 23, 701/25, 301; 180/167, 168, 169

(56) References Cited

U.S. PATENT DOCUMENTS 6,053,268 A * 4/2000 Yamada ..................... 180/167
6,246,226 B1 * 6/2001 Kawase et al. ............. 324/166
6,336,064 B1 * 1/2002 Honkura et al. ............. 701/23

FOREIGN PATENT DOCUMENTS

JP 9-292236 11/1997
JP 10-206173 3/1998

* cited by examiner

Primary Examiner—William A. Cuchlinski, Jr.
Assistant Examiner—Marthe Y. Marc-Coleman
(74) Attorney, Agent, or Firm—Sughrue Mion, PLLC (57) ABSTRACT

A vehicle position recognizing system includes at least one magnetic marker for forming a magnetic field at a predetermined position on the road surface and at least one magnetic sensor for detecting the intensity of the magnetic field formed by the magnetic marker. An on-vehicle detector is provided for performing operation of the vehicle position on the basis of the magnetic field intensity obtained from the magnetic sensor at positions separated forward and backward from the magnetic marker by a predetermined amount. The on-vehicle detector has a correcting unit for correcting the magnetic field intensity of the magnetic marker on the basis of the magnetic field intensity obtained from the magnetic sensor at positions separated forward and backward from the magnetic marker by a predetermined amount. The on-vehicle detector also has a judging unit for judging the presence of the magnetic marker. The correction and judgment are preformed on the basis of an average value of the magnetic field intensity obtained from the magnetic sensor.

8 Claims, 8 Drawing Sheets

VEHICLE POSITION RECOGNIZING SYSTEM

BACKGROUND OF THE INVENTION

1. Field of the Invention

The present invention relates to a vehicle position recognizing system in which a predetermined magnetic field is formed on a predetermined traffic lane, and a vehicle running on the traffic lane detects the position of the own vehicle with a high accuracy.

2. Description of the Prior Art

As shown in, for example, Japanese Iatent Laid-Open No. 10-206173 specification, the conventional vehicle position recognizing system comprises: one or more of magnetic field forming means that is laid on the road surface at a predetermined position to form a predetermined magnetic field; magnetic field intensity detecting means for detecting the magnetic field formed by the magnetic field forming means; vehicle position operation suitability judging means for judging the suitability of performing the vehicle position operation by using the magnetic field intensity obtained by the magnetic field intensity detecting means; and vehicle position operating means that receives the judgment result of the vehicle position operation suitability judging means, and detects the vehicle position on the basis of the magnetic field intensity detected by the magnetic field intensity detecting means.

Furthermore, the magnetic field intensity detecting means is arranged such that it judges in advance the position where the effect of the magnetic field forming means is not received (for example, the middle point of the magnetic field forming means) by using non-magnetic field position judging means, and it records the magnetic field intensity of the non-magnetic field position, and it corrects the magnetic field intensity obtained by the magnetic field intensity detecting means.

With such a configuration, in the conventional system, the magnetic field intensity can be determined without receiving the effect of the earth magnetism or the magnetization of the vehicle, and therefore, an accurate vehicle position can be obtained.

BRIEF SUMMARY OF THE INVENTION

OBJECT OF THE INVENTION

However, the above described conventional system has such a problem that the magnetic field is wrongly detected, or it is not detected, or the vehicle horizontal position with a large error is outputted in the case where a material, a magnetic body or the like which powerfully disturbs the magnetic field exists on the traffic lane, especially, in the case where the magnetized metal in the joint of a concrete road or the structural body in a tunnel or the like forms a magnetic field larger than that of the magnetic field forming mean such as a magnetic marker.

The present invention is made for solving the above described problems, and it is an object to provide a vehicle position recognizing system by which it is possible to eliminate the effect of the magnetic disturbance of a material, a magnetic body or the like which disturbs the magnetic field on the traffic lane, and to surely detect the magnetic marker, and to accurately find the horizontal position of a vehicle.

SUMMARY OF THE INVENTION

The vehicle position recognizing system according to the invention of claim 1 is a system comprising: at least one signal area forming means for forming a magnetic field at a predetermined position on the road surface; at least one magnetic field intensity detecting means for detecting intensity of magnetic field formed by the above described signal area forming means; and vehicle position operating means for performing operation of a vehicle position on the basis of magnetic field intensity obtained by the above described magnetic field intensity detecting means at points separated forward and backward from the above described signal area forming means by a predetermined amount.

According to this configuration, there is such an effect that it is possible to eliminate the effect of the magnetic disturbance of a material, a magnetic body or the like which disturbs the magnetic field on the traffic lane, and to surely detect the magnetic marker, and to accurately determine the horizontal position of the vehicle.

The vehicle position recognizing system according to the invention of claim 2 is a system in which the above described vehicle position operating means has correcting means for correcting magnetic field intensity of the above described signal area forming means on the basis of magnetic field intensity obtained from the above described magnetic field intensity detecting means at points separated forward and backward from the above described signal area forming means by a predetermined amount.

According to this configuration, there is such an effect that even in an extremely large magnetic disturbance, the effect thereof can be eliminated, and an accurate vehicle position can be obtained, and furthermore, even in the case of the first signal area forming means, an accurate vehicle position can be obtained, and furthermore, it is also possible to simultaneously perform elimination of the effect to the magnetic field intensity detecting means because of the temperature fluctuation of the magnetic field intensity detecting means or the sudden magnetization of the vehicle body by the signal area forming means or the like, and moreover, even if the intervals of laying of the magnetic field forming means are variously changed, the detecting reliability is high and the detection accuracy of the vehicle position is also high.

The vehicle position recognizing system according to the invention of claim 3 is a system in which the above described vehicle position operating means has judging means for judging presence of the above described signal area forming mean on the basis of magnetic field intensity obtained from the above described magnetic field intensity detecting means at points separated forward and backward from the above described signal area forming means by a predetermined amount.

According to this configuration, there is such an effect that even in an extremely large magnetic disturbance, the effect thereof can be eliminated, and the detecting reliability can be improved, and furthermore, even in the case of the first signal area forming means, the detecting reliability can also be improved.

The vehicle position recognizing system according to the invention of claim 4 is a system in which the above described correcting means corrects magnetic field intensity of the above described signal area forming means on the basis of an average value of magnetic field intensity obtained from the above described magnetic field intensity detecting means.

According to this configuration, there is such an effect that even in an extremely large magnetic disturbance, the effect thereof can be eliminated, and furthermore, an accurate vehicle position can be obtained, and furthermore, even in the case of the first signal area firming means, an accurate vehicle position can be obtained, and furthermore, it is also possible to simultaneously perform the elimination of the effect to the magnetic field intensity detecting means because of the temperature fluctuation of the magnetic field intensity detecting means or the sudden magnetization of the vehicle body by the signal area forming means or the like, and moreover, even if the intervals of laying of the magnetic field forming means are variously changed, the detecting reliability is high and the detecting accuracy of the vehicle position is also high.

The vehicle position recognizing system according to the invention of claim 5 is a system in which the above described judging means judges presence of the above described signal area forming means on the basis of an average value of magnetic field intensity obtained from the above described magnetic field intensity detecting means.

According to this configuration, there is such an effect that even in an extremely large magnetic disturbance, the effect thereof can be eliminated, and the detecting reliability can be improved, and furthermore, even in the case of the first signal area forming means, the detecting reliability can be improved.

DETAILED DESCRIPTION OF THE PREFERRED EMBODIMENTS

Preferred embodiments of the present invention will be described below on the basis of drawings.
Embodiment 1

Figure 1:
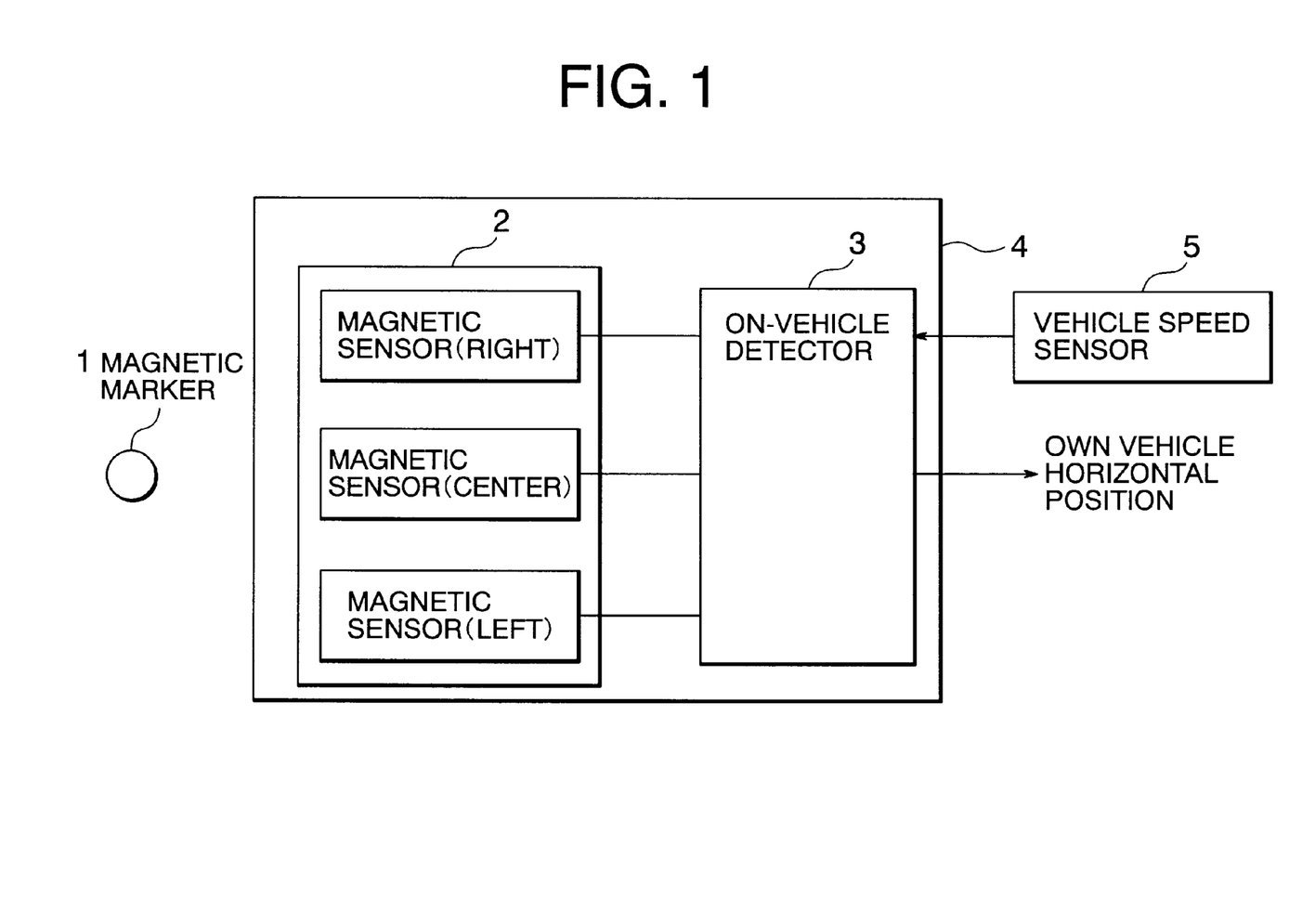
FIG. 1 is a block diagram showing embodiment 1 of the present invention.

FIG. 1 is a block diagram showing a vehicle position recognizing system according to embodiment 1 of the present invention.

In the figure, the vehicle position recognizing system comprises, for example, a magnetic marker 1 as signal area forming means laid in the traffic lane, and a vehicle position detector 4 and a vehicle speed sensor 5 that are mounted on the vehicle. The vehicle position detector 4 has a plurality of magnetic sensors 2 as magnetic field intensity detecting mean that are provided at the center, on the right side, and on the left side of the vehicle, respectively to detect the intensity of the magnetic field formed by the magnetic marker 1, and an on-vehicle detector 3 as vehicle position operating means for performing the vehicle position operation on the basis of the intensity of the magnetic field detected by these magnetic sensors 2 and the vehicle speed from a vehicle speed sensor 5.

Next, the operation will be described.

When the vehicle to which the vehicle position detecting device 4 is mounted runs in the magnetic field formed by the magnetic marker 1 laid on the traffic lane, a plurality of magnetic sensors 2 output magnetic field signals corresponding to the magnetic field intensity of the magnetic marker 1, at that moment. The output signals are supplied to the on-vehicle detector 3, and in the on-vehicle detector 3, the magnetic field spatial magnetic field intensity distribution is obtained by sampling the magnetic field signals of the magnetic sensors 2 according to the output of the vehicle speed sensor 5 or the like, and from this magnetic field spatial magnetic field intensity distribution, the operation of the vehicle position is performed, and the horizontal position of the own vehicle is outputted. The own vehicle performs the warning or the steering control or the like by using the horizontal positional signal.

Figure 2:
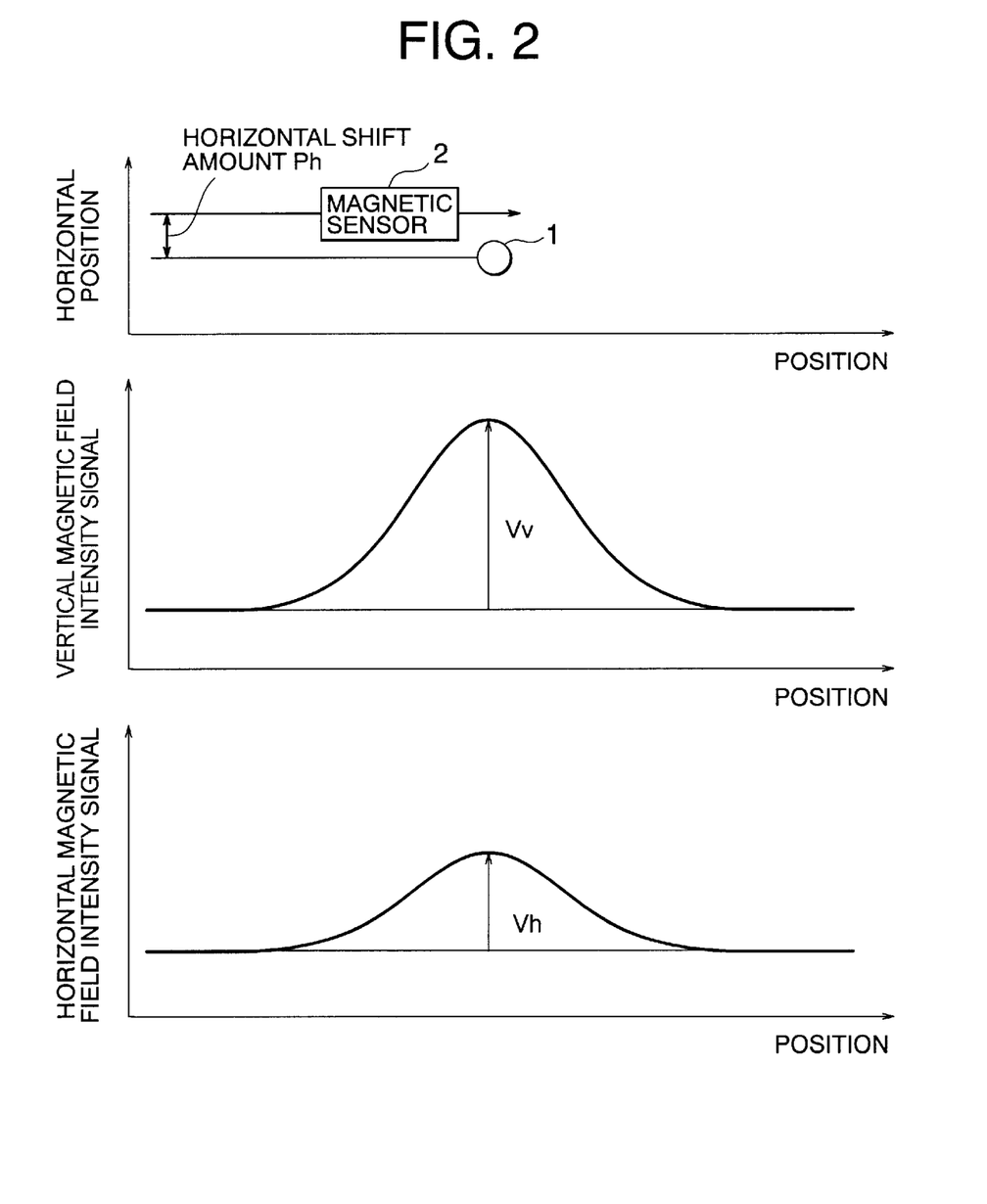
FIG. 2 is a figure showing an output signal of a magnetic sensor in embodiment 1 of the present invention.

FIG. 2 is a figure showing the output signal of the magnetic sensor 2.

When the magnetic sensor 2 mounted on the own vehicle passes near the magnetic marker 1, the magnetic sensor 2 outputs a vertical magnetic field intensity signal and a horizontal magnetic field intensity signal as shown in FIG. 2, according to the vertical magnetic field intensity and the horizontal magnetic field intensity of the magnetic marker 1. The vertical magnetic field intensity signal and the horizontal magnetic field intensity signal show the maximum values at the position nearest to the magnetic marker 1, and they become the values of Vv and Vh, respectively. Furthermore, In Vv and Vh, the plus and minus are reversed by the polarity of the magnetic marker 1. From the obtained vertical magnetic field intensity maximum value Vv and horizontal magnetic field intensity maximum value Vh, the horizontal shift amount Ph of the magnetic sensor 2 to the magnetic marker 1 is determined.

Figure 3:
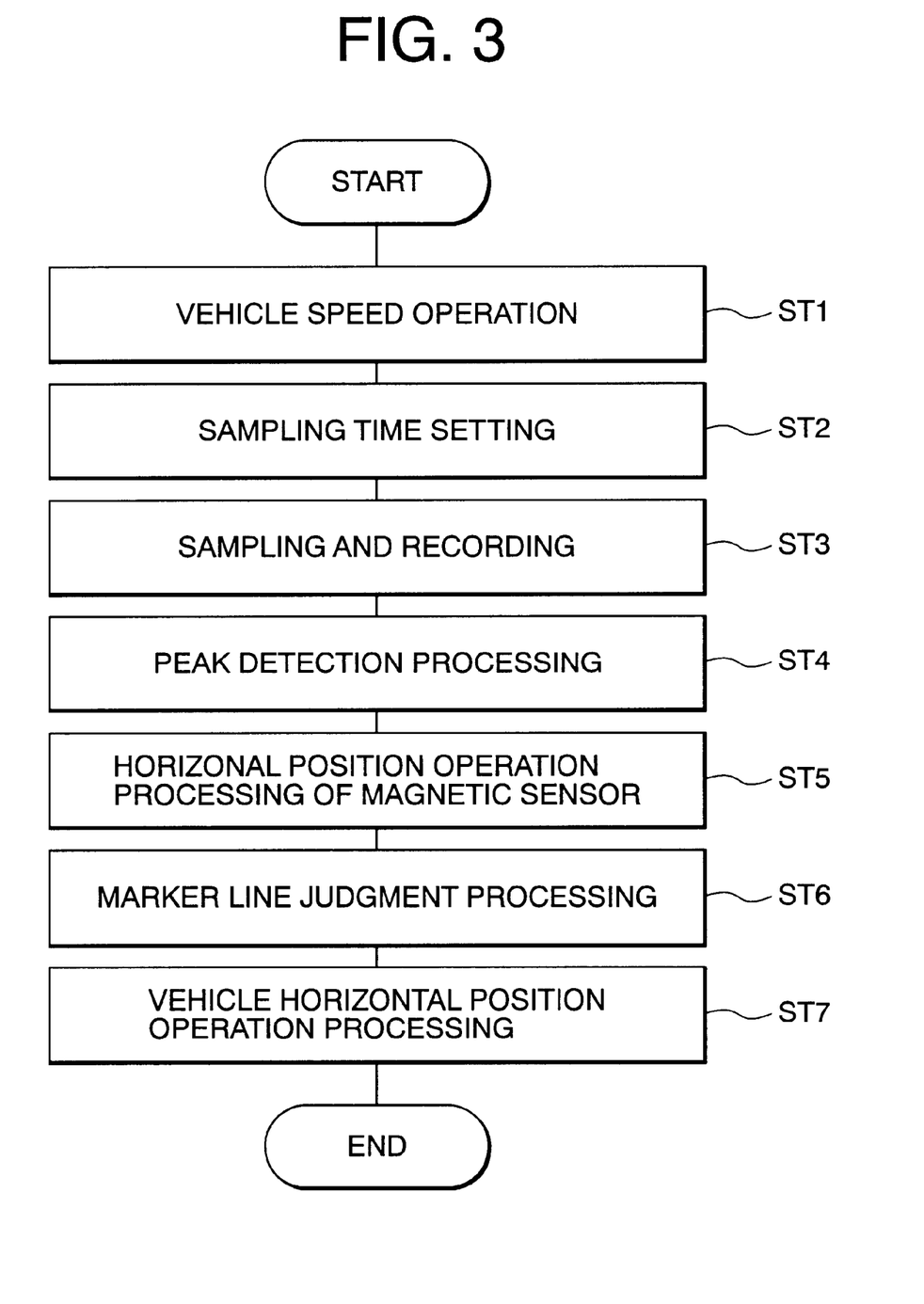
FIG. 3 is a flow chart showing a processing of an on-vehicle detector in embodiment 1 of the present invention.

Next, the processing operation in the on-vehicle detector 3 in FIG. 1 will be described by referring to FIG. 3.

First, at step ST1, the vehicle speed operation is performed by using the signal from the vehicle speed sensor 5. At step ST2, the sampling time for sampling the output signals of the magnetic sensor 2 at a predetermined distance interval (for example, 5 cm) is set from the vehicle speed obtained at step ST1. At step ST3, the output signals of the magnetic sensor 2 are sampled at a time interval obtained at step ST2, and they are stored in a memory (not shown in the figure). Furthermore, here, the vehicle speed operation is performed, and from that, the sampling time has been set so that sampling is performed at a predetermined distance interval, but it is also possible that the travel distance is determined directly from the output pulse of the vehicle speed sensor 5, and the sampling is performed each time the travel distance becomes a predetermined value. Consequently, the output magnetic field intensity signal of the magnetic sensor 2 is stored in the memory as the spatial magnetic field intensity distribution.

Figure 4:
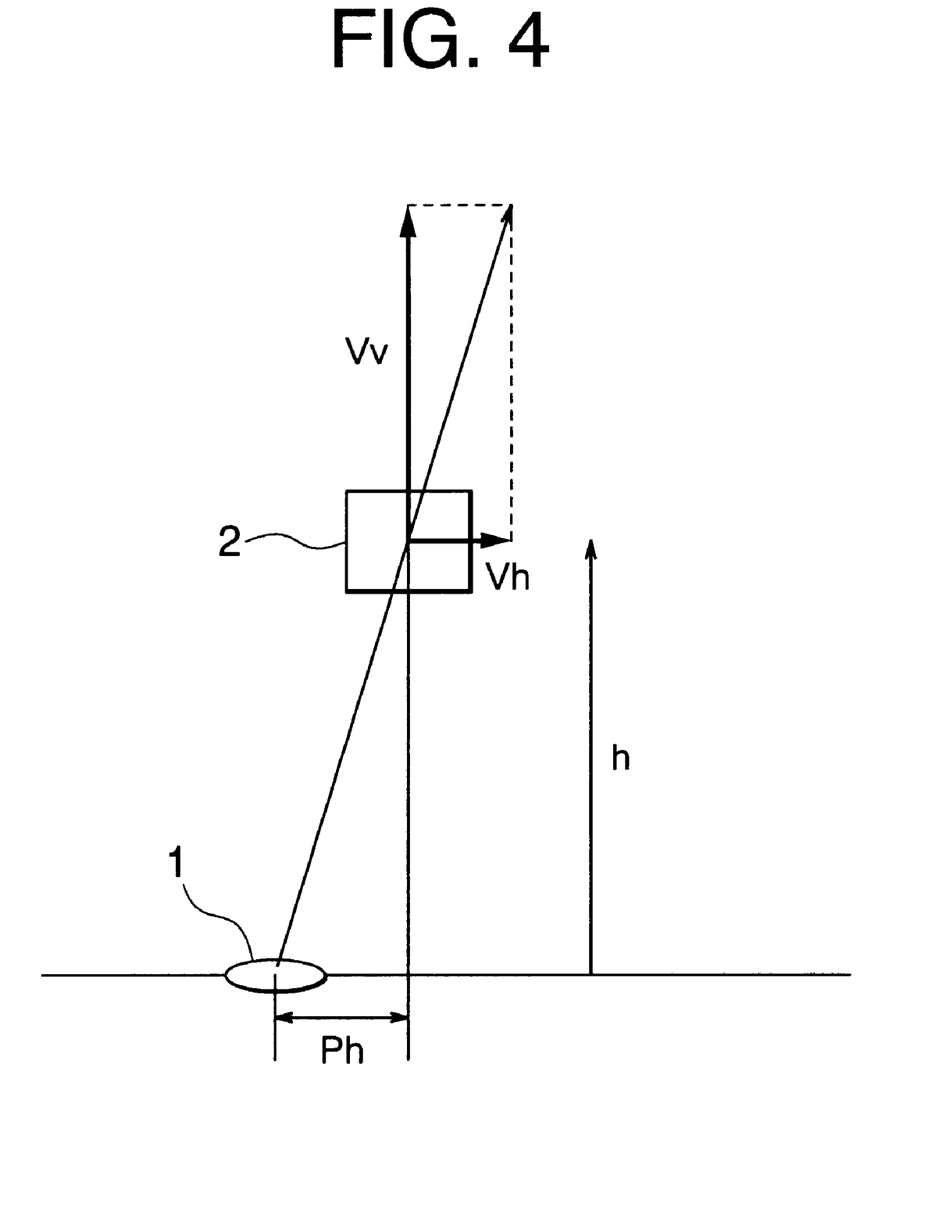
FIG. 4 is a theoretical figure showing one example for finding the amount of horizontal shift in embodiment 1 of the present invention.

Next, at step ST4, a peak value that is the maximum point is determined from the spatial magnetic field intensity distribution of the magnetic sensor 2 that has been obtained at step ST3, and the vertical magnetic field intensity maximum value Vv and the horizontal magnetic field intensity maximum value vh are calculated. Next, at step ST5, from the obtained vv, Vh, and the mounting height h of the magnetic sensor 2, as shown in FIG. 4, the horizontal shift amount Ph of the magnetic sensor 2 to the magnetic marker 1 is found by using the following expression.

$$Ph = k \cdot h \cdot Vh/Vv \quad (1)$$

Furthermore, in the above described expression (1), k is a predetermined coefficient. Moreover, here, the horizontal shift amount Ph has been found from the above described expression (1), but it is also possible to determine that from a map which has been obtained in advance by an experiment or the like.

Furthermore, the horizontal shift amount Phc of the vehicle center to the magnetic marker 1 is determined by adding the offset amount Os of the detected magnet sensor 2 from the vehicle center to the horizontal shift amount Ph of the magnetic sensor 2 to the magnetic marker 1 as shown by the following expression.

$$Phc = Ph + Os \quad (2)$$

Next, at step ST6, in the case where a plurality of lines of magnetic markers 1 which are not shown in the figure exist, and for example, the lane center shows the magnetic marker polarities of N, S, N, S, . . . , and the line shifted to the right side from the lane center by 1 m shows the magnetic marker polarities of N, N, N, N, . . . , and the line shifted to the left side from the lane center by lm shows the magnetic marker polarities of S, S, S, S, . . . , on which marker line the own vehicle runs at present is judged from the polarities of the magnetic marker 1 which was detected in the past, and at step ST7, as shown by the following expression, the offset amount Or of the line of the magnetic marker 1 from the lane center is added to the horizontal shift amount Phc of the vehicle center to the magnetic marker 1, and the shift amount Phr of the vehicle center from the lane center is found.

$$Phr = Phc + Or \quad (3)$$

Next, the peak detection processing shown in ST 4 of FIG. 3 will be described in detail by using FIG. 5 and FIG. 6.

Figure 5:
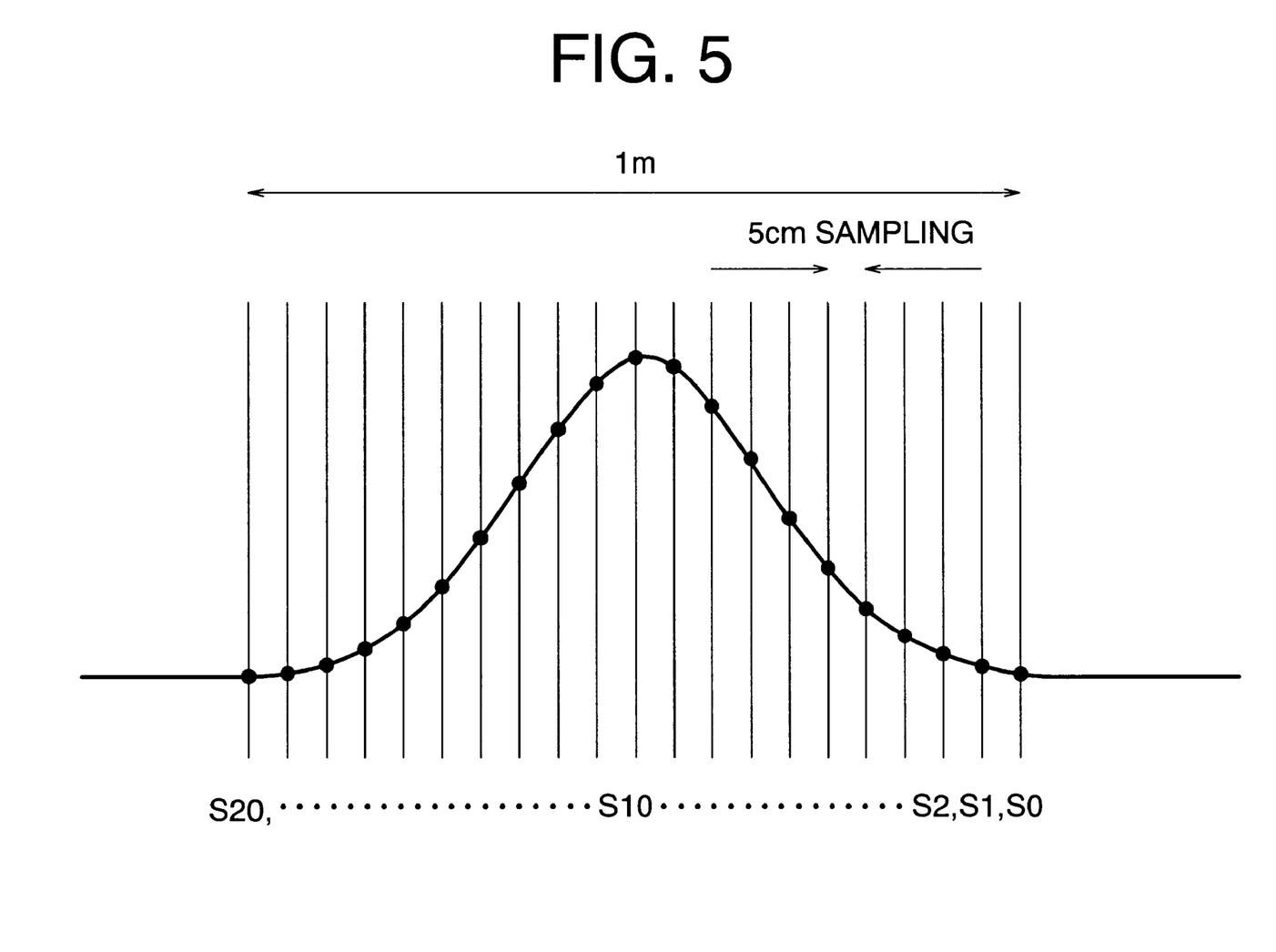
FIG. 5 is a figure to be given for the explanation of operation at the time of sampling magnetic field intensity outputted by the magnetic sensor in embodiment 1 of the present invention.

FIG. 5 is a figure showing the spatial magnetic field intensity distribution at sampling points S0 to S20 obtained as a result of sampling the vertical magnetic field intensity or horizontal magnetic field intensity outputted by the magnetic sensor 2 for every 5 cm. Here, the magnetic sensor 2 approaches nearest to the magnetic marker 1 when sampling the vertical magnetic field intensity or horizontal magnetic field at the sampling point S10, and furthermore, the detection level of the magnetic sensor 2 becomes the earth magnetism level or less when being separated forward and backward from the magnetic marker 1 by 50 cm.

Figure 6:
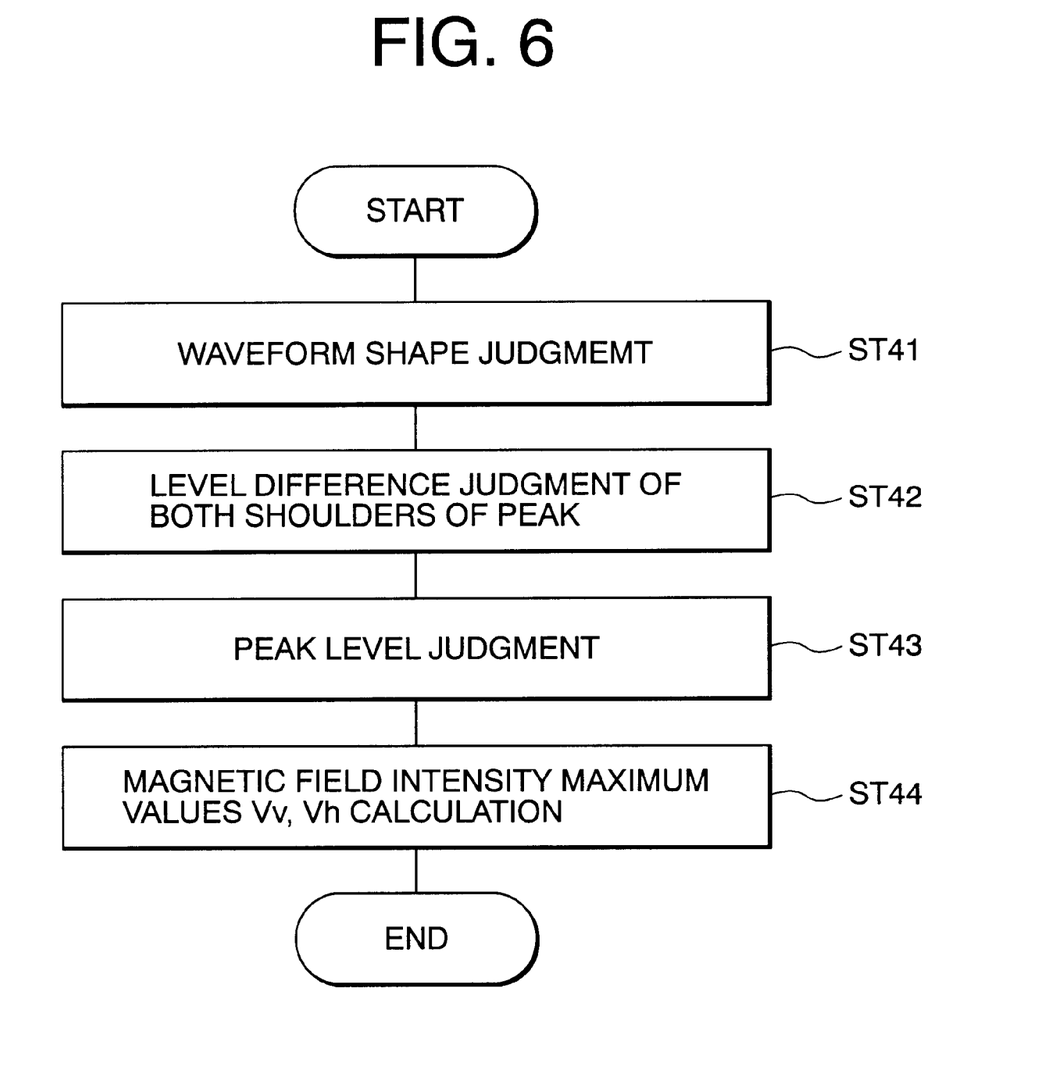
FIG. 6 is a flowchart showing a peak detection processing in embodiment 1 of the present invention.

In FIG. 6, at step ST41, the shape of the waveform is judged, and the vertical magnetic field intensity or horizontal magnetic field intensity at each sampling point are differentiated, and the peak point that is the maximum value of the vertical magnetic field intensity or horizontal magnetic field intensity is found from the sampling point (S10 in FIG. 5) where the plus and minus of the differentiated is reversed. Furthermore, it is also possible that the changing point (S10 in FIG. 5) at the time when the result of the diferentiation is continuously lowered after being continuously increased as shown by the continuous signs of plus, plus, plus, plus, and minus, minus, minus, minus is made to be the peak point. The step advances to step ST42 when the peak point has come to the sampling point S10.

At step ST42, after finding the level differences between the levels of both shoulders of the peak and the peak value, that is, for example, in FIG. 5, the level differences (S10–S15) and (S10–S5) between the peak value of the sampling point S10 and the levels of both shoulders of the peak of the sampling points S15 and S5 where the sampling point S10 is the peak value and the sampling points S15 and S5 are the levels of both shoulders of the peak, it is judged that the level differences are a predetermined value or more, and the step advances to step ST43.

Concretely, in the present embodiment, a plurality of magnetic sensors 2 are mounted on the vehicle, and the system is made such that for example, in the case where the magnetic marker 1 exists in the middle of two magnetic sensors 2, the vertical magnetic field intensity output of each magnetic sensor 2 becomes half when compared with the vertical magnetic field intensity output of the case where the magnetic sensor 2 exists just above the magnetic marker 1, and furthermore, in the case where the detection level of the magnetic sensor 2 becomes the earth magnetism level or less when separated forward and backward from the magnetic marker 1 by 50 cm, if (S10–S15) and (S10–S5) are Vpeak/4 or more, the step advances to step ST43, supposing that the levels of both shoulders of the peak to be judged are the points separated forward and backward from the maximum value by 25 cm. (S5 and S15 in FIG. 5), and that the average value of the absolute value of the previously obtained vertical magnetic field intensity maximum value Vv is Vpeak. The predetermined value changes depending on the characteristic of the magnetic marker 1 and the amounting condition of the magnetic sensor 2 to the vehicle.

At step ST43, for example, (S10–S20) and (S10–S0) that are the vertical magnetic field intensity maximum value Vv are found, and it is judged that the level is a predetermined value or more, and the step advances to step ST44. The levels of the sampling points S0 and S20 are the sampling values at the points separated forward and backward from the magnetic sensor 2 by 50 cm (S0 and S20 in FIG. 5), and they become the earth magnetism level since the points are sufficiently separated from the magnetic marker 1.

Concretely, in the present embodiment, a plurality of magnetic sensors 2 are mounted on the vehicle, and the system is made such that for example, in the case where the magnetic marker 1 exists in the middle of two magnetic sensors 2, the vertical magnetic field intensity output of each magnetic sensor 2 becomes half the detected maximum value, and the step advances to step ST44 if (S10–S0) and (S10–S20) are Vpeak/2 or more, supposing that the average value of the absolute value of the previously obtained vertical magnetic field intensity maximum value Vv is Vpeak. The predetermined value changes depending on the characteristic of the magnetic marker 1 and the mounting condition of the magnetic sensor 2 to the vehicle. Here, the vertical magnetic field intensity maximum value Vv is made to be (S10–S0) and (S10–S20), but the detection accuracy of the vertical magnetic field intensity maximum value Vv is furthermore increased if it is made to be (S10–(S0+S20)/2).

Here, the reason why the sampling points S0 and S20 at points where the effect of the magnetic marker 1 is small are used is that the magnetic sensor 2 receives at all times the magnetic disturbance, for example, the effects from the earth magnetism or the magnetization of the vehicle body, or the magnetized metal such as the joint of the bridge or the steel frame buried in the concrete or the ground, and the offset of the output value of the magnetic sensor 2 changes.

At step ST44, the magnetic sensor that shows the output of the maximum absolute value among the vertical magnetic field intensities found by the plurality of magnetic sensors 2 is selected, and the value is made to be the vertical magnetic field intensity maximum value Vv. Furthermore, the horizontal magnetic field intensity maximum value Vh of the selected magnetic sensor 2 is also similarly determined.

Next, the effect of step ST43 will be described concretely by using FIG. 7.

Figure 7:
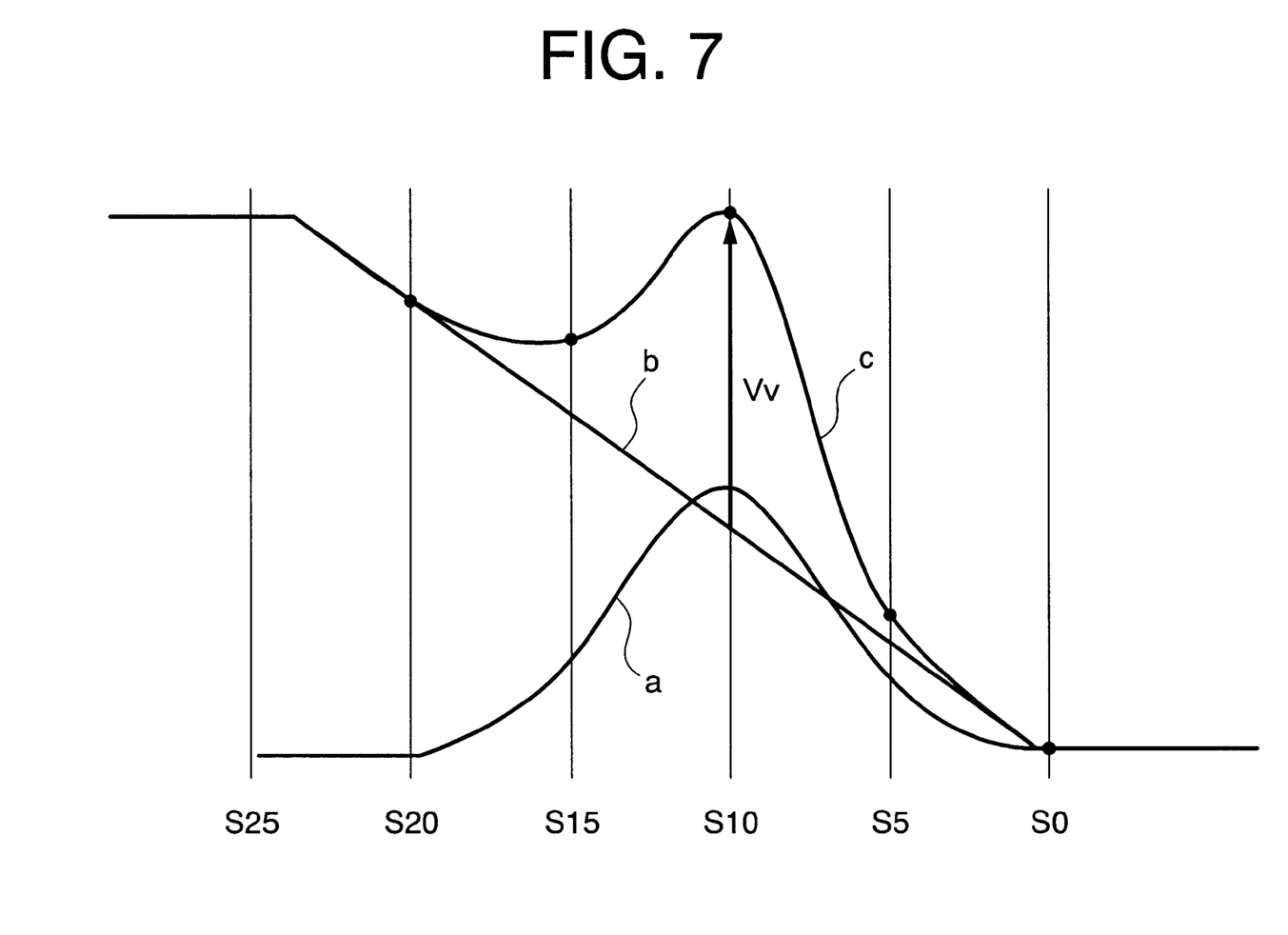
FIG. 7 is a figure to be given for the explanation of operation at the time of sampling magnetic field intensity outputted by the magnetic sensor during an extremely large magnetic disturbance in embodiment 1 of the present invention.

In FIG. 7, the line a expresses the spatial magnetic field intensity distribution of the magnetic marker 1, and the line b expresses the spatial magnetic field intensity distribution of the disturbance of the magnetized metal or the like such as a steel frame buried in the concrete and in the ground, and he line c expresses the spatial magnetic field intensity distribution of the output of the magnetic sensor 2 that is made by composing the spatial magnetic field intensity distribution a and the disturbance spatial magnetic field intensity distribution b.

For example, in the case of the vehicle position recognizing system described in the above described Japanese Patent Laid-Open No. 10-206173 specification, the sampling value of the non-magnetic field position (for example, the middle point of the magnetic markers buried at an interval of 2 m) has previously been recorded as a correction value (sampling point of S25 in FIG. 7), and the subtraction of the sampling value and the correction value is performed by the magnetic field sampling value correcting means to obtain the vertical magnetic field intensity maximum value Vv. In the case of this conventional method, the difference between the correction value obtained at the sampling point S25 and the sampling value of the point near the actual marker that is obtained at the sampling point S10 becomes small, and it is impossible to accurately find the vertical magnetic field intensity, and furthermore, the magnetic marker cannot be detected. On the contrary, in the case of the present embodiment, the average value of the values at the sampling points S20 and S0 separated forward and backward by 50 cm from the sampling point S10 near the marker is made to be the correction value, and the effect of the magnetic disturbance can be eliminated, and therefore, it is possible to accurately find the vertical magnetic field intensity maximum value. The situation is similar in the horizontal direction. Therefore, the accuracy in the operation value of the horizontal position shift amount Ph is improved. Furthermore, the magnetic marker 1 can surely be detected.

Furthermore, in the case of the conventional method, if the non-magnetic field position of the magnetic marker is, for example, a point of 1 m that is the middle point of the magnetic markers buried at an interval of 2 m, there are some cases where the magnetic field component at that point is considerably different from that of the magnetic disturbance at point near the magnetic marker, and lowering of the detecting performance and lowering of the horizontal positional accuracy are caused, and furthermore, if the magnetic markers are not previously buried at a constant interval, the non-magnetic field position cannot be judged. On the contrary, in the case of the present embodiment, even if intervals of burying are variously changed, the effect of the magnetic disturbance is not received, and the detecting reliability can be improved, and the accuracy in the operational value of the horizontal positional shift amount can also be improved, since the average value of the sampling points S20 and S0 that are separated forward and backward by 50 cm from the sampling point S10 near the marker is the correction value.

Furthermore, the difference between the levels of both shoulders of the peak (for example, S5 and S15) and the level of the maximum value (S10) is used for the judging condition, and therefore, as a result, the sharpness of the peaks is compared in an area where the effect of the disturbance is small. Generally, the part of occurrence of the disturbance exceeding the marker signal is a steel frame buried in the ground or the like, and therefore, it exists at a position separated by a distance more than the distance between the magnetic marker 1 and the magnetic sensor 2. Therefore, the sharpness of the peak of the disturbance component is not shaper than that of the magnetic marker 1.

Figure 8:
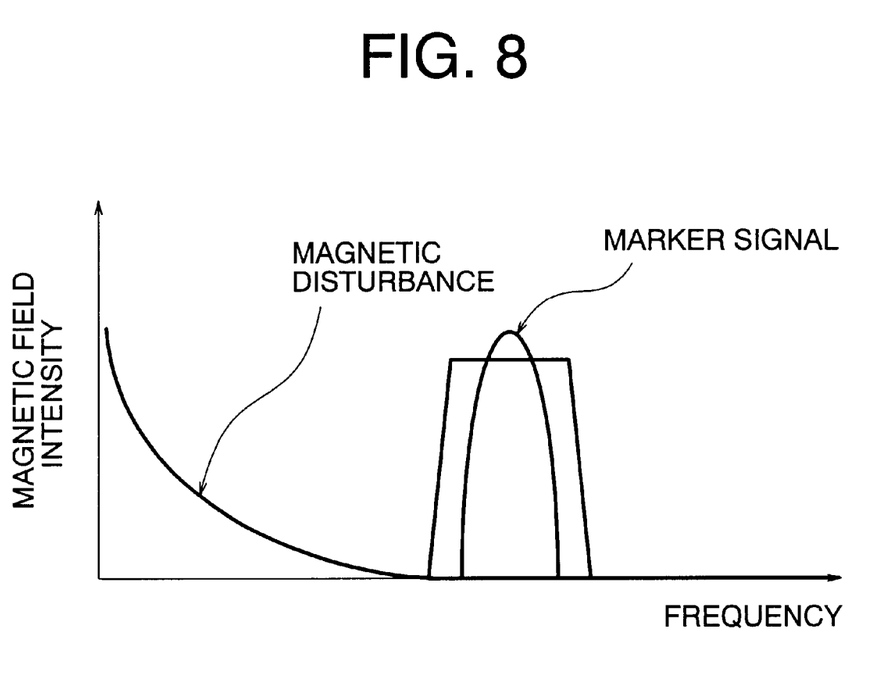
FIG. 8 is a conceptual diagram to be given for the explanation of operation at the time of detecting only a marker signal in embodiment 1 of the present invention.

Accordingly, as shown in the conceptual diagram of FIG. 8, in the spatial frequency component of the signal, the marker signal is higher, and by judging by using the difference between the levels of both shoulders of the peak (S5 and S15) and the level of the maximum value (S10), only the marker signal can be detected. Furthermore, the maximum value (S15 in FIG. 7) or the like made by adding the disturbance signal and the marker signal is also judged by the difference between the levels of both shoulders of the peak (S5 and S15) and the level of the maximum value (S10), and therefore, it does not occur to wrongly detect the disturbance signal as the magnetic marker 1. Furthermore, here, the marker signal has been judged at two points of both shoulders of the peak, but if it is judged at a plurality of points, the detecting reliability is furthermore improved.

Thus, in the case of the present embodiment, it is arranged that the magnetic marker signal is detected by using signals at the maximum point and predetermined positions separated forward and backward therefrom, in the output of the magnetic sensor, and therefore, the detection can accurately be performed from the magnetic marker to be detected for the first time, and the horizontal position of the vehicle can accurately be found. Furthermore, it is arranged that the magnetic field intensity of the magnetic marker signal is corrected by using the signals of the maximum point and predetermined positions separated forward and backward therefrom, and therefore, the detection can accurately be performed from the magnetic marker to be detected for the first time, and the horizontal position of the vehicle can accurately be found.

What is claimed is:

1. A vehicle position recognizing system comprising:
   at least one signal area forming means for forming a magnetic field at a predetermined position on a road surface;
   at least one magnetic field intensity detecting means for detecting intensity of magnetic field formed by said signal area forming means; and
   vehicle position operating means for performing operation of a vehicle position on the basis of only a horizontal component and a vertical component of a magnetic field intensity obtained from said magnetic field intensity detecting means at points separated forward and backward from said signal area forming means by a predetermined amount.

2. The vehicle position recognizing system according to claim 1, wherein said vehicle position operating means includes correcting means for correcting magnetic field intensity of said signal area forming means on the basis of magnetic field intensity obtained from said magnetic field intensity detecting means at points separated forward and backward from said signal area forming means by a predetermined amount.

3. The vehicle position recognizing system according to claim 1, wherein said vehicle position operating means includes judging means for judging presence of said signal area forming means on the basis of magnetic field intensity obtained from said magnetic field intensity detecting means at points separated forward and backward from said signal area forming means by a predetermined amount.

4. The vehicle position recognizing system according to claim 2, wherein said correcting means corrects magnetic field intensity of said signal area forming means on the basis of an average value of magnetic field intensity obtained from said magnetic field intensity detecting means.

5. The vehicle position recognizing system according to claim 3, wherein said judging means judges presence of said signal area forming means on the basis of an average value of magnetic field intensity obtained from said magnetic field intensity detecting means.

6. A vehicle position recognizing system comprising:

at least one signal area forming means for forming a magnetic field at a predetermined position on a road surface;

at least one magnetic field intensity detecting means for detecting intensity of magnetic field formed by said signal area forming means; and vehicle position operating means for performing operation of a vehicle position on the basis of magnetic field intensity obtained from said magnetic field intensity detecting means at points separated forward and backward from said signal area forming means by a predetermined amount;

wherein said vehicle position operating means includes correcting means for correcting magnetic field intensity of said signal area forming means on the basis of magnetic field intensity obtained from said magnetic field intensity detecting means at points separated forward and backward from said signal area forming means by a predetermined amount.

7. The vehicle position recognizing system according to claim 6, wherein said correcting means corrects magnetic field intensity of said signal area forming means on the basis of an average value of magnetic field intensity obtained from said magnetic field intensity detecting means.

8. A vehicle position recognizing system comprising:

at least one signal area forming means for forming a magnetic field at a predetermined position on a road surface;

at least one magnetic field intensity detecting means for detecting intensity of magnetic field formed by said signal area forming means; and vehicle position operating means for performing operation of a vehicle position on the basis of magnetic field intensity obtained from said magnetic field intensity detecting means at points separated forward and backward from said signal area forming means by a predetermined amount;

wherein said vehicle position operating means includes judging means for judging presence of said signal area forming means on the basis of magnetic field intensity obtained from said magnetic field intensity detecting means at points separated forward and backward from said signal area forming means by a predetermined amount;

wherein said judging means judges presence of said signal area forming means on the basis of an average value of magnetic field intensity obtained from said magnetic field intensity detecting means.

\* \* \* \* \*